C. R. ROOF.
APPARATUS FOR MANUFACTURING GRIP NUTS.
APPLICATION FILED SEPT. 7, 1915.
1,209,501.
Patented Dec. 19, 1916.
3 SHEETS—SHEET 3.
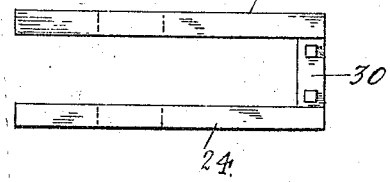
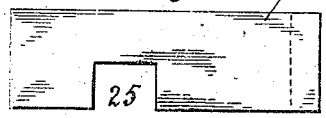
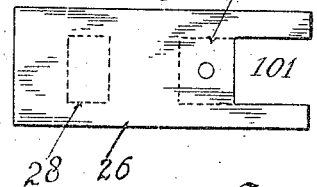
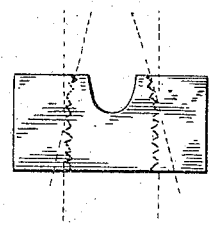
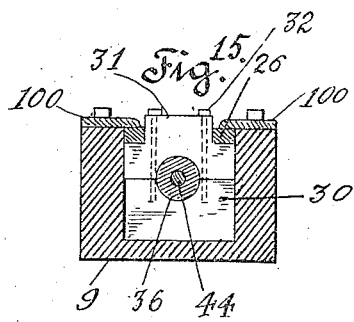
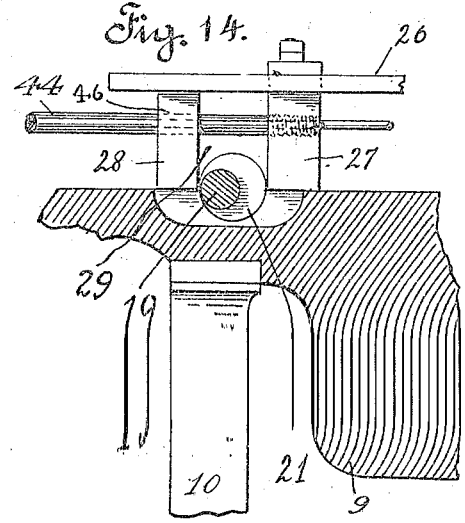
Witness,
F. Monteverde.
Inventor,
Charles R. Roof
by Hazard Berry & Miller
Attorneys.

C. R. ROOF.
APPARATUS FOR MANUFACTURING GRIP NUTS.
APPLICATION FILED SEPT. 7, 1915.
1,209,501.
Patented Dec. 19, 1916.
3 SHEETS—SHEET 2.
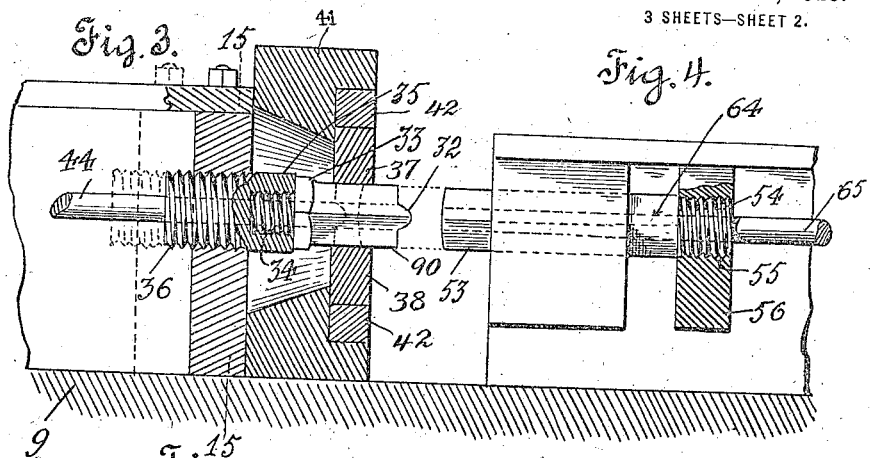
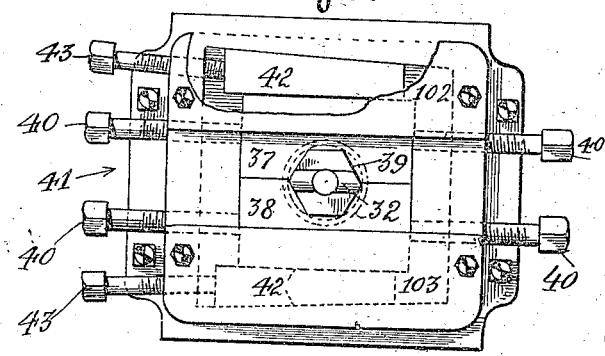
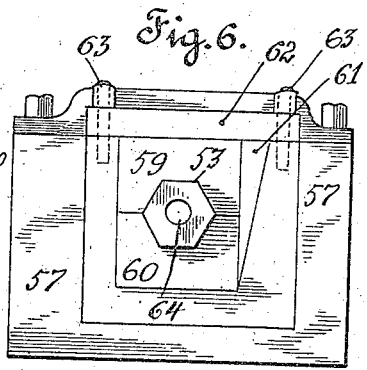
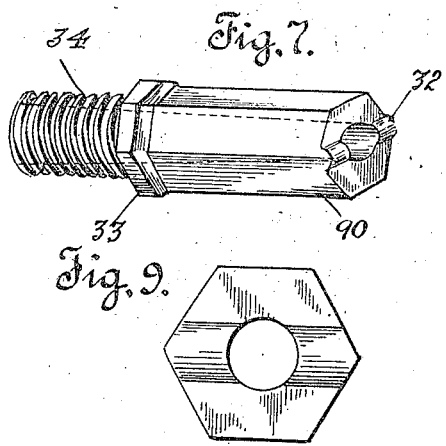
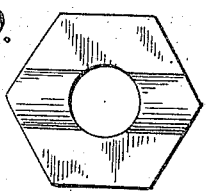
Witness,
H. E. Monteverde.
Inventor,
Charles R. Roof,
by Hazard Berry & Miller
Attorneys.

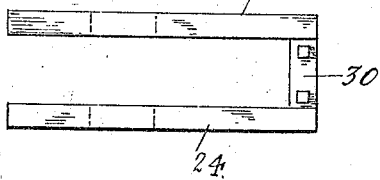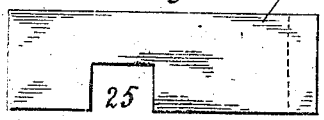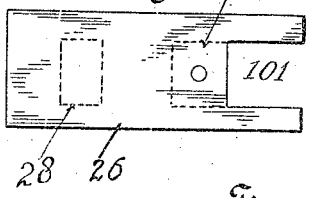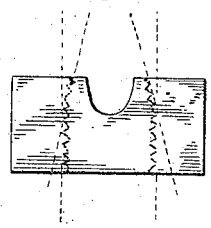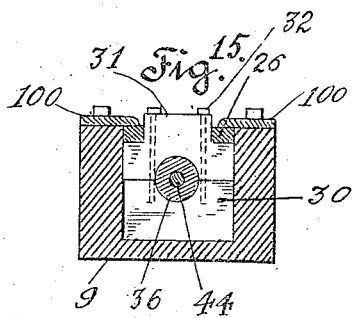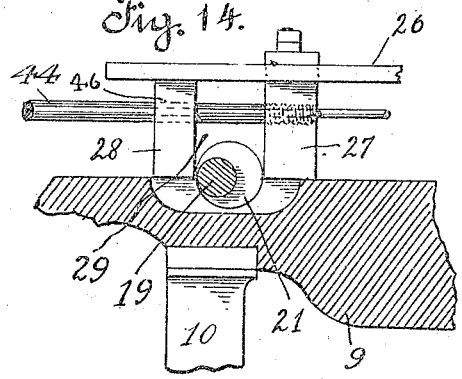

UNITED STATES PATENT OFFICE.

CHARLES RICHARD ROOF, OF LOS ANGELES, CALIFORNIA.

APPARATUS FOR MANUFACTURING GRIP-NUTS.

1,209,501.

Specification of Letters Patent.   Patented Dec. 19, 1916.

Application filed September 7, 1915.   Serial No. 49,186.

*To all whom it may concern:*

Be it known that I, CHARLES R. ROOF, a citizen of the United States, residing at Los Angeles, in the county of Los Angeles and State of California, have invented new and useful Improvements in Apparatus for Manufacturing Grip-Nuts, of which the following is a specification.

This invention relates to improvements in an apparatus for manufacturing grip nuts, and the objects of the invention are to reduce the cost of manufacture, and to enable the greater part of the formation of the nut to be performed by a pressing or rolling operation.

Another object is to construct an apparatus for carrying out the method of manufacturing grip nuts described in the patent of Frederick William Wright and Charles Richard Roof, #1,112,879 granted Oct. 6th, 1914; and also the improved method of manufacturing grip nuts described in my co-pending application Serial #31,369 filed June 1st, 1915.

With these and other objects in view, which will appear as the description proceeds, my invention consists in the construction and arrangement of parts hereinafter described and claimed.

In the accompanying drawings, which form a part of this specification, I have shown a convenient and practical embodiment of my invention, and in which, Figure 1, is a side elevation, partly in section, of my improved apparatus. Fig. 2, is a top plan thereof. Fig. 3, is an enlarged detail view taken on line 3—3 Fig. 2, showing the forward end of the crowner and piercing tool. Fig. 4, is a similar view taken on line 4—4 Fig. 2 of the cut-off tool. Fig. 5, is an enlarged front view of the crowner end of the machine. Fig. 6, is an enlarged front view of the cut-off end of machine. Fig. 7, is a perspective view of the crowner.
Fig. 8, is a perspective view of the cut-off tool. Fig. 9, is a top plan view of a blank nut manufactured by said apparatus. Fig. 10, is a side view thereof. Fig. 11, is a top plan view of the crowner slide. Fig. 12, is a side elevation thereof. Fig. 13, is a top plan view of the piercer slide. Fig. 14, is a detail view showing a side elevation of the piercer slide with parts coöperating therewith. Fig. 15, is a detail cross sectional view on line 15—15, Fig. 3, showing also the slide retaining guide plates. Fig. 16, is a side elevation of the finished grip nut.

10 designates the uprights supporting a rectangular frame 11 in which a driving shaft 12 is suitably journaled. A fast pulley 13 and a loose pulley 14 are mounted on said shaft whereby power from any suitable source is transmitted to drive shaft 12.

15 is a balance wheel mounted on the shaft and serves to prevent jars and shocks, and insures a smooth operation of the machine. A small gear wheel 16 mounted fast on shaft 12 engages and drives two large gears 17 and 18 in a clockwise direction, as shown by the arrows in Fig. 1. Gear 17 is mounted on the outer end of a counter shaft 19, which is suitably journaled in frame 11, and which operates the tools of the crowner end of the machine. Gear 18 is mounted on the outer end of a counter shaft 20, which is likewise suitably journaled in the frame 11, and which operates the tools of the cut-off end of the machine. A bed 9, supported by the uprights extends longitudinally of the machine forming the support and the guide of the slides to be hereinafter referred to.

Referring now to the construction of the crowner end of the machine. The shaft 19 is driven with two sets of eccentric cams, a central cam 21 and a pair of lateral cams 22 located adjacent and on opposite sides of central cam 21. The lateral cams 22 are of the same size and shape and act oppositely to the center cam 21 so that when the extreme forward movement of cam 21 is reached the lateral cams 22 will occupy their extreme rearward movement. The lateral cams 22 engage the bottom or crowner slide 23, which consists of a pair of spaced vertical members 24 provided with vertical cam slots 25 in which lateral cams 22 are positioned, see Fig. 1. Lying flat upon the upper face of the bottom slide is a top or piercer slide 26. A pair of lugs 27 and 28 extending vertically downward from approximately the middle portion thereof provide a cam slot 29 in which the central cam 21 is positioned. The bottom and the side walls of the box shaped bed 9 form a guide for the slides above referred to. A pair of longitudinal metal guide plates 100 are bolted on the upper face of bed 9 and form inwardly extending flanges, which engage the upper face of the top slide 26, thus preventing any upward displacement of said slides, (see Fig. 15). The forward end of the top slide is forked, providing a large rectangular slot 101.

From the description just given it will be understood that rotation of the shaft 19 will cause a horizontally reciprocating movement of the bottom and top slides in opposite directions. The forward ends of the two members 24 of the bottom slide are connected by a cross piece 30 which is provided at the middle of its upper end with a semi-cylindrical threaded groove coöperating with a semi-cylindrical threaded groove of the same size of a top cap 31 adapted to be held in engagement with the cross piece 30 by means of vertical stud bolts 32. The rectangular slot 101 in the forward end of the top slide affords space for the reciprocal movement of said cap, which extends above the upper face of the bottom slide.

The crowner tool 90 is hexagonal in cross section and adapted to make hexagonal nuts although it will be understood that the same machine is adapted to manufacture square nuts as well, and all that is necessary is to substitute a square crowner and a corresponding square die box, and a correspondingly shaped cut of tool. The crowner consists of a shank body of tool steel and is provided at its forward end with a horizontal semi-cylindrical rib 32. The inner end has a shoulder 33. A reduced threaded end section 34 engages an internally threaded socket 35 of corresponding size in the forward end of a tool holding member 36, which at the inner end is externally threaded and adapted to engage the threaded bore formed by the cross piece 30 and the cap 31.

The front face of the crowner end of the machine is made up of a die box consisting of an upper and lower vertical die plate 37 and 38 respectively, which, when assembled in the head 41 has a hexagonal opening 39 of a size corresponding to the size of the crowner. These plates are held against lateral movement by means of screw bolts 40 passing laterally through the lateral sides of head 41 of the crowner end. A pair of upper and lower wedge members 42 are held securely in position against slipping by means of screw bolts 43, which passing through the lateral sides of the head 41 abut against the larger ends of said wedge members securely holding the die plates 37 and 38 against vertical movement. A pair of vertical top and bottom binder plates 102, 103, secured to the front of the head 41, hold the dies against forward displacement.

The crowner and the tool holder are provided with a central cylindrical bore adapted to receive a piercer rod 44, which is slidably movable therein. The same extends longitudinally through the center of the crowner end of the machine and passing through the center of the stop plate 48, and screw member 47, hereinafter referred to, projects at the rear end thereof and is provided with a handle 45. The piercer passes through the downwardly extending lugs 27 and 28 of the crowner slide. Lug 28 is provided with a bore 46 in which the piercer is mounted. Lug 27 is provided with a threaded bore adapted to engage the threaded end of the enlarged rear section of the piercer. The section of the piecer extending from lug 27 to the end of the crowner tool is reduced in diameter.

Provision for longitudinal adjustment of the crowner and the piercer is made as follows: An adjusting screw member 47 engages a correspondingly threaded bore in the rear end of the crowner section. Integral with the forward end of the screw member 47 is a crowner slide stop plate 48. The outer end of the screw member is provided with a hand wheel 49 whereby the stop plate 48 may be longitudinally adjusted. The rearward movement of the bottom slide is limited by the stop plate 48. In order to allow this adjustment a suitable amount of lost motion between the lateral cams 22 and the bottom slide is provided. The piercer is adjusted by turning handle 45 which rotates the piercer and by means of the screw threaded bore of lug 27 adjusts the same longitudinally.

Referring now to the cut-off end of the machine. The shaft 20 is provided with a crank 49 which engages a crank box 50. This crank is loosely mounted in the crank box chamber 51 of the cut-off slide 52, and is open at the top allowing the crank box to reciprocate vertically. The cut-off slide, in order to insure great strength and rigidity extends throughout the whole length of the cut-off end of the machine. A hexagonal cut-off tool 53 having a slightly convex forward end is secured to said slide by means of its threaded end 54, which engages a correspondingly threaded bore 55 in the cut-off slide. This bore 55 is formed by a lug 56 extending vertically upward from the slide. The forward end of the cut-off section is built up by a pair of vertical die plates 59 and 60 providing a hexagonal aperture in which the cut-off tool 53 is slidably mounted. The die plates 59 and 60 are held in place by means of a wedge member 61 and a top bar 62 screwed down on the cut-off head 57 by screw bolts 63. A central longitudinal cylindrical bore 64 extending throughout the length of the cut-off tool is adapted to receive a pin or slug pusher rod 65. The same is loosely mounted in the cut-off tool and extends rearwardly and engages with its inner end a downwardly projecting central pusher stop 66. This stop is secured to a transverse guide bar 58 bolted to the bed frame of the machine.

Operation: A steel or iron bar of suitable width and thickness and provided with a longitudinal semi-cylindrical groove on its flat face is fed along the face of the crowner head end so as to cover the hexagonal aperture 39 of the die box consisting of the die-plates 37 and 38, the grooved side being toward said aperture. The rotation of shaft 12 will through intermediate gear 16 transmit motion to the large gears 17 and 18. The cams operating the crowner and piercer slides 23 and 26, respectively, and the cut-off slide 52 are so constructed and timed that when the crowner slide 52 moves rearwardly and recedes for a slight distance within the aperture of the die block, the cut-off tool 53 will advance and push or shear off a blank nut from the end of the heated metal bar and force the same against the crowner end. By adjusting the crowner stop plate 48 the thickness of the blank nut can be regulated. The cut-off tool 53 presses the heated metal against the crowner 90, but is kept at the desired spaced distance by the proper adjustment of the stop plate 48. At the moment when the cut-off and the crowner tools 53 and 90, respectively have reached their extreme forward position and while the blank nut is held securely between said tools, the piercer tool 44 is advanced and pierces the blank nut punching out a cylindrical slug from the center of the nut blank and pushing the same into the center bore 64 of the cut-off tool. On the continued rotation of the cams and the crank above mentioned, the piercer recedes and the crowner 90 advances so as to project slightly from the die box thereby pushing the blank nut out of the die block. The nut blank falls down an incline chute (not shown) and is removed from the machine. At the same moment that the nut blank is removed from the die block, the cut-off tool 53 recedes in its rearward movement and causes the slug pusher rod 65 to engage the stop 66 thereby causing a relative movement between said rod and the cut-off tool. The rearward movement of the cut-off tool 53 and the stationary slug pushing rod 65 will eject the core which was cut out by the piercer 44 from the blank nut and pushed into the interior of the cut-off tool 53. The slugs fall down the same chute with the blank nuts. The normal speed of the slides is about 70 reciprocations a minute, thus forming about 70 blank nuts.

The iron or steel bar from which the blank nuts are cut is provided with a longitudinal cylindrical groove on the face, which is held flat against the die box. This longitudinal groove is of slightly smaller cross section than the horizontal rib 32 on the outer face of the crowner 90. The outer face of the cut off tool 53 is slightly convex as clearly shown in Fig. 8. Therefore, when the blank nut is cut off the bar, the rib 32 will engage the corresponding groove of the metal bar but being slightly larger than said groove, will spread and expand the groove and force the nut blank to assume a slightly tapered shape. The nut blank will be wider at the grooved crowner end than at the cut-off end. (See Fig. 10.) The cut-off end is slightly concaved corresponding to the shape of the end of the cut-off tool. It is not necessary, especially when smaller nuts are to be produced to provide the longitudinal groove in the bar from which the blank nuts are to be cut off. The rib 32 of the crowner 90 will shape the blank nut so as to provide the groove in the blank nut. After the nuts leave the machine they are tapped. Then their upper portions on opposite sides of the grooves of the nut are pressed toward each other by any suitable means such as co-acting jaws which approach each other within a predetermined distance and engage the upper portion of the nut referred to. This compressing action on the blank nut will effect that the lateral sides, which are parallel to the groove, as well as the concave bottom, of the nut will be straightened, thus forming a nut having plane surfaces at right angles to each other. The upper portion of the threads will be slightly reduced in diameter, usually one-sixty-fourth to one-thirty-second of an inch, depending upon the size of the nut.

The present invention is not concerned with the operations of the succeeding steps as outlined in the preceding paragraph. Its sole object is to modify the crowner and cut-off tools so as to turn out a blank nut which is suitable for the production of a grip nut as described in the patent of Wright and Roof #1,112,879, and my co-pending application Serial #31,369 above referred to. The applicant makes no claim to the general organization or construction of the machine except as to the modified crowner and cut-off tools.

The sides of the nut on opposite sides of the groove are compressed toward each other but a very small amount, from one-sixty-fourth to one-thirty-second of an inch. It is therefore obvious that if the nuts before compression vary in width even as little as one-sixty-fourth part of an inch, the finished nuts will vary in the diameter of the upper threads. Therefore in the case where the blank nut through fire waste of the bar, or any other reason, is below the standard width of the nut, no such uniform compression of the sides thereof will take place and consequently perfectly uniform grip nuts can not be produced.

By modifying the shape of the crowner and the cut-off tool, as above described, a blank nut is produced of absolutely uniform width at the crowner end since the expanding rib on the crowner will expand the metal until it engages the side walls of the die block.

It is not absolutely necessary to make the cut-off tool with a slightly convexed end, but by giving it such a shape an improved grip nut is formed because the last step of compression of the upper part of the nut above referred to, will straighten and flatten out the bottom of the finished nut, thus leaving it flat, without the concave bottom of the blank nut. If the blank nut were made with a flat bottom the compression of the upper part of the nut would tend to make the bottom of the finished nut slightly convexed.

I claim:

1. In a machine for making grip nuts, the combination of a frame, a die-box, a slide, means for reciprocating said slide, a crowner secured to said slide slidably mounted in said die-box, a cut-off tool coacting with said crowner, said crowner being provided on its face with an expanding rib and said cut-off tool being provided with a convex face whereby the nut is pressed into shape and expanded at its crowned end.

2. In a machine for making grip nuts, the combination of a frame, a die-box, a slide mounted thereon, means for reciprocating said slide, a crowner secured to said slide slidably mounted in said die-box, a cut-off tool, means for reciprocating said cut-off tool, said cut-off tool being adapted to coact with said crowner, said crowner being provided on its face with an expanding rib whereby the nut is pressed into shape and expanded.

3. In a machine for making grip nuts, the combination of a frame, a crowner provided with nut expanding means on its face mounted thereon, means for reciprocating said crowner, a cut-off tool having a convex face, means for reciprocating said cut-off tool, said cut-off tool coacting with said crowner to press and expand the nut.

4. In a machine for making grip nuts, the combination of a pair of reciprocating coacting devices adapted to cut-off a section of a metal bar and to press the same into the shape of a nut, to form a groove and to expand the upper end of the nut in one operation.

In testimony whereof I have signed my name to this specification.

CHARLES RICHARD ROOF.